US012643458B2

(12) United States Patent  
Nuhn

(10) Patent No.: US 12,643,458 B2  
(45) Date of Patent: Jun. 2, 2026

(54) DOOR ASSEMBLY FOR A MANURE HOLDING TANK

(71) Applicant: Nuhn Industries Ltd., Sebringville (CA)

(72) Inventor: Ian Nuhn, Stratford (CA)

( * ) Notice: Subject to any disclaimer, the term of this patent is extended or adjusted under 35 U.S.C. 154(b) by 508 days.

(21) Appl. No.: 18/365,613

(22) Filed: Aug. 4, 2023

(65) Prior Publication Data

US 2024/0059206 A1 Feb. 22, 2024

Related U.S. Application Data

(60) Provisional application No. 63/399,954, filed on Aug. 22, 2022.

(51) Int. Cl.  
B60J 5/10 (2006.01)  
B60P 3/22 (2006.01)

(52) U.S. Cl.  
CPC ............. B60P 3/2205 (2013.01); B60J 5/108 (2013.01); B60P 3/226 (2013.01)

(58) Field of Classification Search  
CPC .......... B60P 3/2205; B60P 3/226; B60J 5/108  
USPC ..................................................... 296/100.07  
See application file for complete search history.

(56) References Cited

U.S. PATENT DOCUMENTS

| | | | | | |
|---|---|---|---|---|---|
| 2,121,596 | A | * | 6/1938 | Hill ......................... | B60P 3/226 |
| | | | | | 292/259 R |
| 2,239,269 | A | * | 4/1941 | Lundvall ................. | B60P 3/226 |
| | | | | | 105/377.07 |
| 2,239,326 | A | * | 4/1941 | Holby ..................... | B60P 3/226 |
| | | | | | 292/336 |
| 4,014,271 | A | * | 3/1977 | Rohlf ................... | A01C 23/021 |
| | | | | | 239/662 |
| 4,547,099 | A | * | 10/1985 | Alexandrov ......... | B65D 90/623 |
| | | | | | 292/201 |
| 7,802,694 | B2 | * | 9/2010 | Lee ............................. | B01J 3/03 |
| | | | | | 220/582 |
| 2011/0031801 | A1 | * | 2/2011 | Malatesta ............. | B60P 3/2245 |
| | | | | | 298/17 B |
| 2014/0262993 | A1 | * | 9/2014 | Bossom ................... | E03F 9/00 |
| | | | | | 210/241 |
| 2018/0313131 | A1 | * | 11/2018 | Matye .................... | B65D 90/10 |
| 2019/0016246 | A1 | * | 1/2019 | Maiorana ................. | B60P 1/26 |
| 2021/0394663 | A1 | * | 12/2021 | Meyer ................... | E02F 3/8891 |

(Continued)

FOREIGN PATENT DOCUMENTS

| | | | | | |
|---|---|---|---|---|---|
| CA | 3122003 | A1 | * | 12/2021 | ............. E05F 15/53 |
| CN | 201980127 | U | * | 9/2011 | |
| CN | 205135182 | U | * | 4/2016 | |

(Continued)

*Primary Examiner* — Hilary L Gutman  
(74) *Attorney, Agent, or Firm* — Brunet & Co. Ltd.; Robert Brunet; Hans Koenig

(57) ABSTRACT

A door assembly for a manure holding tank comprises a door, at least one latch subassembly for locking the door when the door is closed and a door operating mechanism. The at least one latch subassembly is mountable on the manure holding tank. The door operating mechanism is mountable on the holding tank and connected to the door for opening and closing the door. The door operating mechanism comprises a pivotably moveable portion to open and close the door and a linearly translatable portion that cooperates with the at least one latch subassembly to lock and unlock the door.

17 Claims, 5 Drawing Sheets

(56) References Cited

U.S. PATENT DOCUMENTS

2022/0341243 A1 * 10/2022 Matye ..................... E05B 81/10

FOREIGN PATENT DOCUMENTS

| CN | 211251457 U | * | 8/2020 | |
|----|----|----|----|----|
| CN | 112721787 A | * | 4/2021 | .............. E03F 9/007 |
| CN | 113320996 A | * | 8/2021 | .............. B60P 3/226 |
| CN | 117549820 A | * | 2/2024 | .............. B60P 3/226 |
| EP | 3815969 A1 | * | 5/2021 | .............. B65D 90/00 |
| FR | 3051743 A1 | * | 12/2017 | .............. E03F 7/103 |
| GB | 2352001 A | * | 1/2001 | .............. B60P 3/226 |
| JP | H0619667 Y2 | * | 5/1994 | |
| KR | 20200036822 A | * | 4/2020 | ............. B65D 90/10 |
| LU | 502043 B1 | * | 11/2022 | ............. B60P 3/2275 |

* cited by examiner

DOOR ASSEMBLY FOR A MANURE HOLDING TANK

CROSS-REFERENCE TO RELATED APPLICATIONS

This application claims the benefit of U.S. provisional patent application 63/399,954, filed Aug. 22, 2022, which is incorporated by reference herein in its entirety.

FIELD

This application relates to agriculture, in particular to manure handling.

BACKGROUND

Manure collecting vehicles are vehicles that are propelled through alleyways in large livestock (e.g., cattle) barns to clean the alleyways of manure. Such vehicles may be self-propelled or trailers towed by a prime mover (e.g., a tractor or a truck). Manure is collected by a manure collector at the front of the vehicle as the vehicle moves down the alleyway, the collected manure transferred to a manure holding tank on the vehicle. Once collected, the manure is generally transported to a different site where the manure is deposited out a rear hatch on the manure holding tank.

Typical manure collecting vehicles have a cover over the back hatch that needs to be manually installed on the holding tank and then manually uninstalled when the manure is to be removed from the holding tank. However, it would be useful to be able to remotely open and close the cover over the rear hatch as well to simultaneously unlock and lock the cover to better seal the secure the hatch against leakage, especially when the collecting vehicle utilizes vacuum to collect the manure, and/or to ensure that the cover does not unexpectedly open.

Thus, there remains a need for a cover for a manure exit aperture of a manure holding tank of a manure collection vehicle, the cover being operable remotely to open and close and to unlock and lock the cover in a simple and efficient manner.

SUMMARY

A door assembly for a manure holding tank comprises: a door; at least one latch subassembly for locking the door when the door is closed, the at least one latch subassembly mountable on the manure holding tank; and, a door operating mechanism mountable on the holding tank and connected to the door for opening and closing the door, the door operating mechanism comprising a pivotally moveable portion to open and close the door, the door operating mechanism comprising a linearly translatable portion that cooperates with the at least one latch subassembly to lock and unlock the door.

A manure collecting vehicle comprises: a manure collector; a manure holding tank in communication with the manure collector to permit passage of collected manure from the manure collector to the manure holding tank; and, a door assembly as described above mounted on the manure holding tank to cover a manure exit aperture in the manure holding tank.

The door of the door assembly preferably comprises a plate sized and shaped to cover a manure exit aperture of the manure holding tank of the vehicle. The door preferably includes a perimetrical seal for sealing the door to the manure exit aperture to prevent or reduce air and/or manure leakage around the door. Further, the door preferably comprises a port configured to be interchangeably plugged with a plug or fitted with a sprayer conduit. The plug seals the port to prevent manure from exiting the holding tank and to prevent air from entering the holding tank. The sprayer can be used in manure spreading operations when the vehicle is equipped with a blower.

In some embodiments, the door operating mechanism comprises at least one elongated support member, preferably at least two elongated support members, for example two elongated support members. In some embodiments, the at least one elongated support member comprises a first elongated support member and a second elongated support member, where the first and second elongated support members are spaced-apart. The at least one elongated support member supports the door and is pivotally connected to the vehicle, for example pivotally connected to the manure holding tank, more preferably pivotally connected to a tank outlet of the manure holding tank. The tank outlet may be equipped with at least one door mount to which the at least one elongated support member is ultimately mounted.

In some embodiments, the door operating mechanism comprises at least one actuator mountable to the manure holding tank and operably mounted to the at least one elongated support member. In some embodiments, the at least one actuator is pivotally mounted to the manure holding tank and pivotally mounted to the at least one elongated support member. In some embodiments, the door operating mechanism comprises at least one mounting arm to which both the at least one elongated support member and the at least one actuator are pivotally mounted, the mounting arm fixedly mounted to the holding tank, for example through the at least one door mount. In some embodiments, the at least one actuator comprises a first actuator and a second actuator. The first actuator may be pivotally mountable to the manure holding tank proximate the proximal end of the first elongated support member and pivotally mounted to the distal end portion of the first elongated support member. The second actuator may be pivotally mountable to the manure holding tank proximate the proximal end of the second elongated support member and pivotally mounted to the distal end portion of the second elongated support member. The first and second actuators may be operable in a first direction to unlock and then open the door when the door is closed. In some embodiments the at least one actuator comprises a piston and cylinder actuator, for example a hydraulic cylinder, a pneumatic cylinder or an electric linear actuator.

In some embodiments, the door operating mechanism comprises at least one slide guide pivotally mountable to the manure holding tank and fixedly connected to the door. The at least one elongated support member is slidingly retained on the at least one slide guide and is able to translate linearly on the at least one slide guide relative to the at least one slide guide. In some embodiments, actuation of the at least one actuator causes the at least one elongated support member to linearly translate on the at least one slide guide to engage and disengage with the latch subassembly to lock and unlock the door. In some embodiments, actuation of the at least one actuator causes the at least one elongated support member to pivot when the door is unlocked thereby causing the at least one slide guide to pivot about a pivot axis to open and close the door. In some embodiments, the at least one actuator is operable in a first direction to unlock and then open the door when the door is closed, and is operable in a second direction to close then lock the door when the door is open.

In some embodiments, the at least one elongated support member comprises at least one stop mounted thereto. The at least one stop may be positioned on the at least one elongated support member to engage the at least one slide guide after the door is unlocked to prevent further linear translation of the at least one elongated member in the first direction relative to the at least one slide guide so that further actuation of the at least one actuator in the first direction causes the at least one elongated member to pivot thereby causing the at least one slide guide to pivot about the pivot axis to open the door.

In some embodiments, the at least one slide guide comprises a first slide guide and a second slide guide. The first slide guide may be pivotally mountable to the manure holding tank and slidingly retaining a proximal end portion of the at least one elongated support member. The first slide guide nay be pivotally mountable to the manure holding tank to pivot about a first pivot axis while slidingly retaining a proximal end portion of the first elongated support member. The second slide guide may be fixedly connected to the door and slidingly retaining a distal end portion of the at least one elongated support member. The second slide guide may be fixedly connected to the door while slidingly retaining a distal end portion of the first elongated support member. In some embodiments, the at least one slide guide comprises a third slide guide and a fourth slide guide, the third slide guide pivotally mountable to the manure holding tank to pivot about a second pivot axis and slidingly retaining a proximal end portion of another elongated support member. The fourth slide guide may be fixedly connected to the door and slidingly retaining a distal end portion of the other elongated support member.

In some embodiments, the door assembly further comprises a first hinge and a second hinge. The first and third slide guides may be fixedly connected to the first and second hinges, respectively. The first and second hinges may be pivotally mounted to the holding tank to be pivotal about the respective pivot axes.

In some embodiments, the door assembly further comprises a first mounting arm and a second mounting arm. The first and second mounting arms may be fixedly mounted to the manure holding tank proximate the proximal ends of the first and second elongated support members. The first actuator may be pivotally connected to the first mounting arm. The second actuator may be pivotally connected to the second mounting arm. The first hinge may be pivotally connected to the first mounting arm. The second hinge is pivotally connected to the second mounting arm.

In some embodiments, the door assembly further comprises a cross-brace connecting the first elongated support member to the second elongated support member, the cross-brace positioned on the first and second elongated support members to engage the second and fourth slide guides after the door is unlocked to prevent further linear translation in the first direction of the first and second elongated members relative to the second and fourth slide guides so that further actuation of the first and second actuators in the first direction causes the first and second elongated members to pivot thereby causing the first and third slide guides to pivot about respective pivot axes to open the door. In some embodiments, the door assembly further comprises another cross-brace connecting the first and third slide guides. In some embodiments, the door assembly further comprises yet another cross-brace connecting the first elongated support member to the second elongated support member, the cross-brace positioned on the first and second elongated support members between the first and second slide guides and between the third and fourth slide guides.

In some embodiments, the at least one latch subassembly comprises two spaced-apart lugs mounted on the manure holding tank and a pin connecting the lugs to form a latch aperture. The latch aperture engages a distal end of the at least one elongated support member as the at least one elongated support member translates linearly to lock the door when the door is closed. In some embodiments, the at least one latch subassembly comprises a roller rotatably mounted on the pin. The distal end of the at least one elongated support member contacts the roller when the at least one elongated support member translates linearly to lock and unlock the door. In some embodiments, the at least one elongated support member comprises a tapered portion that engages the roller. In some embodiments, the at least one latch subassembly comprises a first latch subassembly and a second latch subassembly that cooperate with the first and second elongated support members, respectively, to lock and unlock the door.

In some embodiments, the manure holding tank comprises a tank outlet and the door assembly is mounted on the tank outlet. In some embodiments, the manure holding tank is a vacuum tank. In some embodiments, the vehicle is self-propelled.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
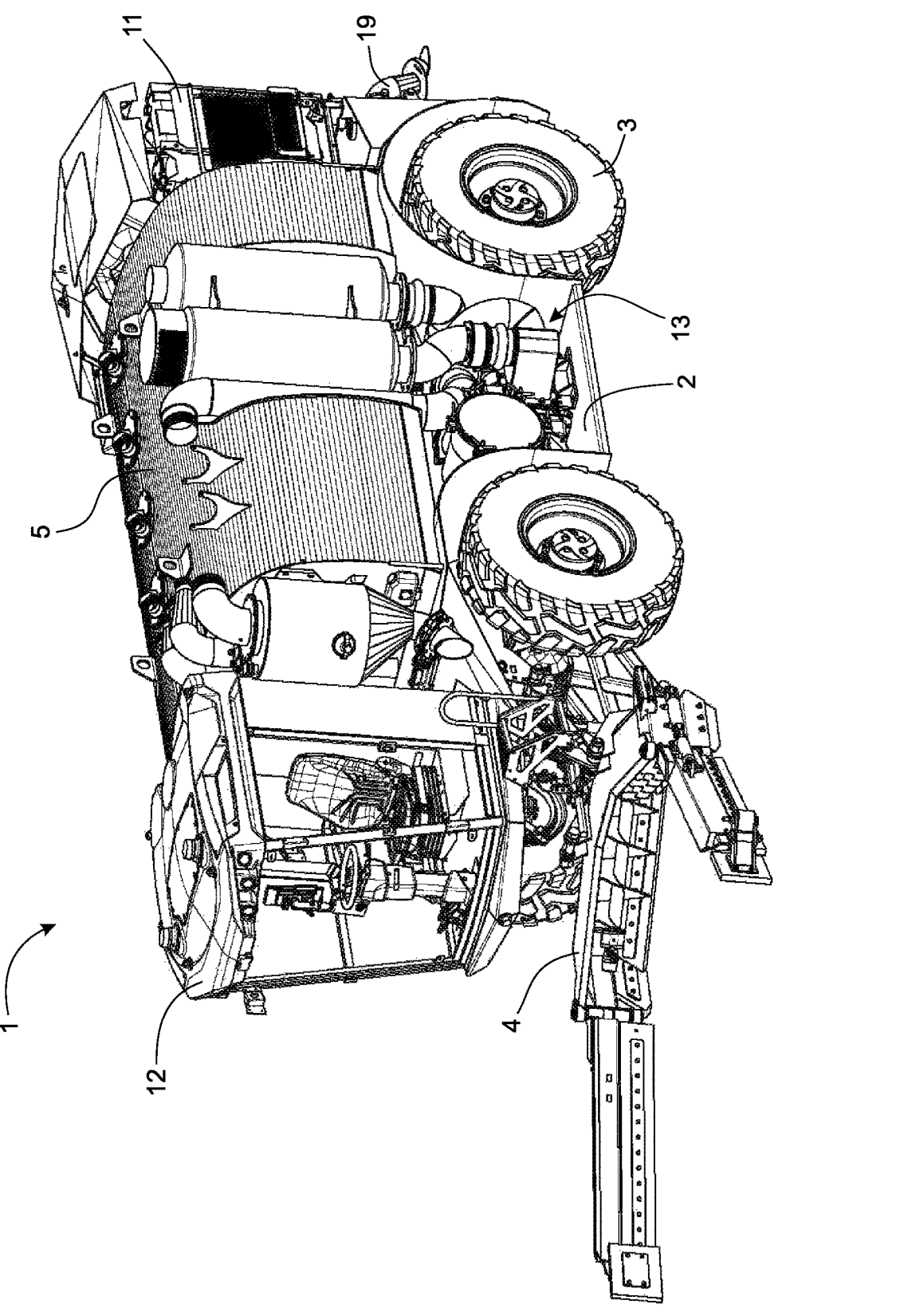
FIG. 1 depicts a front perspective view of a manure collecting vehicle comprising a door assembly for a manure holding tank of the vehicle.
Figure 2:
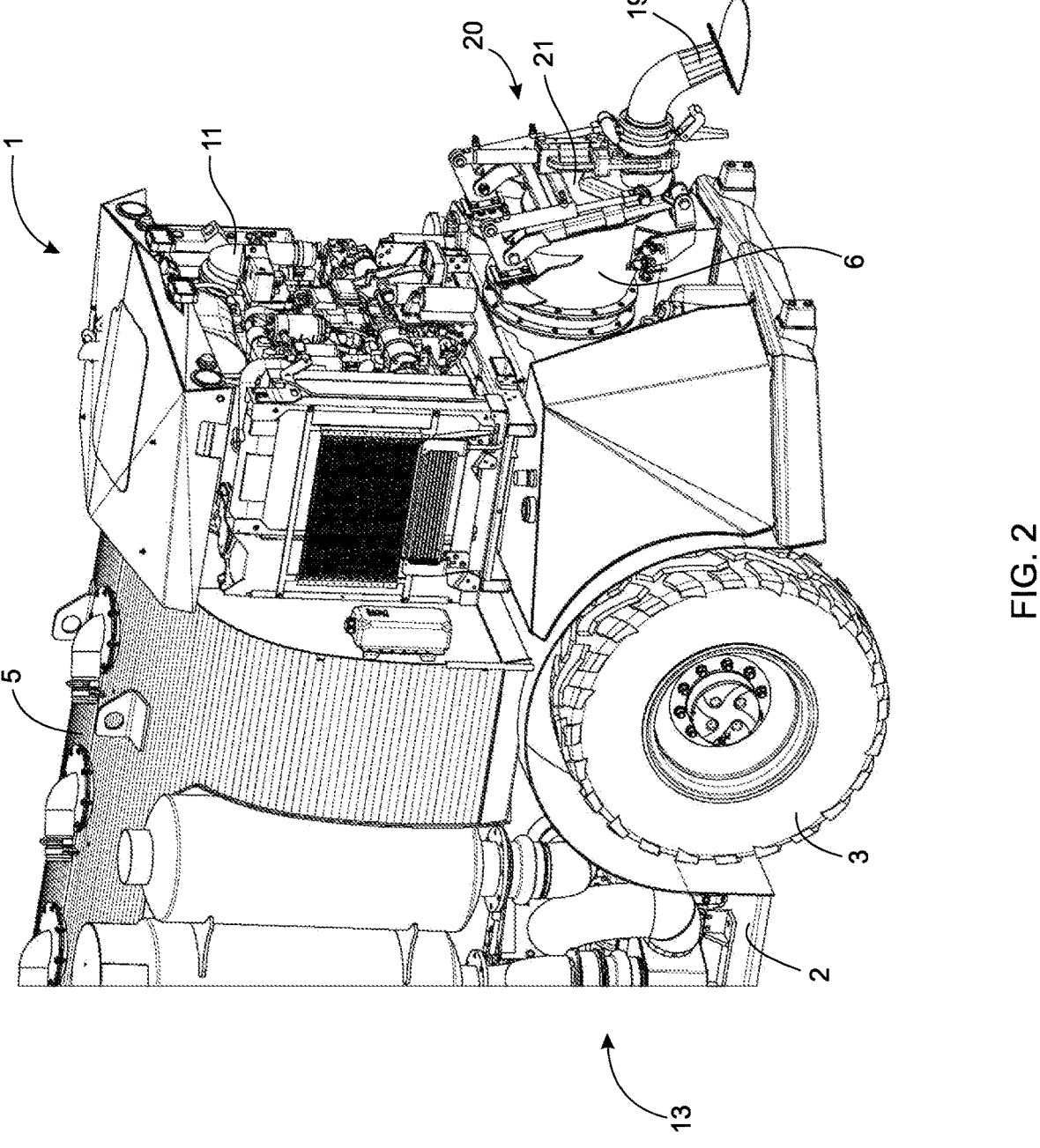
FIG. 2 depicts a perspective view of a rear end of the vehicle of FIG. 1.

One embodiment of a manure collecting vehicle 1 is illustrated in FIG. 1 and FIG. 2. The manure collecting vehicle 1 comprises a chassis 2, a plurality of wheels 3 (only one labeled), a manure collector 4 mounted at a front of the vehicle 1, a manure holding tank 5 supported on the chassis 2 and a door assembly 20 in accordance with the present invention mounted on the holding tank 5 at a rear of the vehicle 1. The holding tank 5 is in communication with the manure collector 4 to permit passage of collected manure from the manure collector 4 to the manure holding tank 5. The holding tank 5 comprises a tank outlet 6 at a rear of the holding tank 5, the tank outlet 6 terminating in a manure exit aperture 7 (see FIG. 5C) through which the manure can exit from the holding tank 5. In the illustrated embodiment, the manure collecting vehicle 1 is self-propelled and therefore also comprises an engine 11 for operating the driven components of the vehicle 1 and a control cab 12 containing controls for the vehicle 1 and a place for an operator to occupy while controlling the vehicle 1. In the illustrated embodiment, the manure collecting vehicle 1 is also vacuum-based, therefore the vehicle further comprises a blower assembly 13 mounted on the chassis 2 for creating low pressure (e.g., a vacuum) in the holding tank 5 to assist with collection of the manure. The vehicle 1 has a longitudinal axis extending between the front and rear of the vehicle 1 horizontal with respect to the ground.

With reference to FIG. 2 to FIG. 5C, the door assembly 20 is mounted on the tank outlet 6 of the holding tank 5 at the rear of the vehicle 1. In order to mount the door assembly 20 on the tank outlet 6, the tank outlet 6 is equipped with two laterally spaced-apart door mounts 15 and two laterally spaced-apart latch subassembly mounts 16. The door mounts 15 are located on upper left and right sides of the tank outlet 6. The latch subassembly mounts 16 are located on lower left and right sides of the tank outlet 6. The mounts 15, 16 are fixedly connected to or integrally formed with an outer surface of the tank outlet 6. The mounts 15, 16 may comprise, for example, one or more of a bracket, block, plate, flange and the like configured to securely mount relevant part of the door assembly 20 as described below. While two door mounts 15 and two latch subassembly mounts 16 are illustrated, additional door mounts and latch subassembly mounts, or only one door mount and one latch mount, may be utilized.

The door assembly 20 comprises a door 21 that covers the manure exit aperture 7 when the door 21 is closed, as seen in FIG. 2 to FIG. 4C. The door 21 comprises a port 23, which can be plugged with a plug (not shown) to seal the port 23 or can be fitted with a sprayer conduit 19 when the vehicle 1 is to be used as a manure spreader after having collected manure in the holding tank 5. The door 21 further comprises a door seal 25 around a perimeter of the door 21 that creates an air seal between the door 21 and the tank outlet 6 at the exit aperture 7, which is particularly useful for maintaining vacuum in the holding tank 5 during a manure collection operation and for preventing leakage around the door 21 during a manure spreading operation. The door seal 25 may comprise any suitably flexible or compressible material, such as an elastomer, for example rubber, that is resistant to degradation when in contact with manure.

The door assembly 20 further comprises two laterally spaced-apart latch subassemblies 30 mounted on the tank outlet 6 through the latch subassembly mounts 16. The latch subassemblies 30 may be secured to the latch subassembly mounts 16 by any suitable method, for example bolting, riveting, welding and the like. Each latch subassembly 30 comprises two spaced-apart lugs 31 extending outwardly from a base plate 32. A pin 33 connects the lugs 31 to form a latch aperture 34 bounded by the lugs 31, the base plate 32 and the pin 33. The latch subassembly 30 further comprises a roller 35 rotatably mounted on the pin 33. The base plate 32 is mounted on the latch subassembly mount 16. The latch subassemblies 30 are involved with locking and unlocking the door when the door is closed. Locking and unlocking operations are described below. While two latch subassemblies 30 are illustrated, additional latch subassemblies, or only one latch subassembly, may be utilized.

The door assembly 20 further comprises a door operating mechanism mountable on the holding tank 5 and connected to the door 21 for opening and closing the door 21, as well as for locking and unlocking the door 21 in cooperation with the latch subassemblies 30. In the illustrated embodiment, the door operating mechanism is mounted on the tank outlet 6 through the door mounts 15. Compressible gaskets 17, for example rubber gaskets, are situated between the door operating mechanism and the door mounts 15 to absorb forces to permit smoother and quieter operation of the door operating mechanism.

The door operating mechanism comprises two (left and right) laterally spaced-apart lifting arm subassemblies 40 connected together by cross-braces 70. The lifting arm subassemblies 40 comprise mounting arms 41, at proximal ends of the lifting arm subassemblies 40, configured to be fixedly mounted to the door mounts 15 to thereby mount the lifting arm subassemblies 40 on the door mounts 15. The mounting arms 41 comprise, for example, one or more of a bracket, block, plate, flange and the like. The lifting arm subassemblies 40 further comprises actuators 42 (e.g., hydraulic cylinders, pneumatic cylinders, electric linear actuators or the like) pivotally connected to the mounting arms 41 at first cylinder pins 43 so that the actuators 42 can pivot about an upper pivot axis oriented horizontally with respect to the ground and transversely with respect to the vehicle 1 when the door assembly 20 is mounted on the vehicle 1. The lifting arm subassemblies 40 further comprise hinges 44, for example in the form of flanges, pivotally connected to the mounting arms 41 at hinge pins 45 so that the hinges 44 can pivot about a middle pivot axis oriented horizontally with respect to the ground and transversely with respect to the vehicle 1 when the door assembly 20 is mounted on the vehicle 1. The lifting arm subassemblies 40 further comprise upper slide guides 46 fixedly connected to the hinges 44. The lifting arm subassemblies 40 further comprise elongated support members 50, for example tubes, bars or the like, which have proximal end portions that are slidingly mounted on the upper slide guides 46. Thus, the upper slide guides 46 are configured to retain the proximal end portions of the elongated support members 50 while permitting the elongated support members 50 to translate linearly thereon. In the illustrated embodiment, the upper slide guides 46 are tubes that are shaped and sized to permit the elongated support members 50 to translate linearly therein, the elongated support members 50 extending out from both ends of the upper slide guides 46. The elongated support members 50 have tapered portions 52 at a lower (distal) ends thereof. The lifting arm subassemblies 40 further comprise lower slide guides 47 configured to retain distal end portions of the elongated support members 50 while permitting the elongated support members 50 to translate linearly thereon. In the illustrated embodiment, the lower slide guides 47 are also tubes that are shaped and sized to permit the elongated support members 50 to translate linearly therein, the elongated support members 50 extending out from both ends of the lower slide guides 47. The elongated support members 50 are pivotally connected to the actuators 42 proximate distal ends of the elongated support members 50 and distal ends of the actuators 42, whereby the actuators 42 and the elongated support members 50 pivot about a lower pivot axis oriented horizontally with respect to the ground and transversely with respect to the vehicle 1 when the door assembly 20 is mounted on the vehicle 1.

Thus, the lifting arm subassemblies 40 comprise triangle linkages having three sides defined by: a) the elongated support members 50 plus the hinges 44; b) the actuators 42; and, c) the mounting arms 41, whereby two of the sides, i.e., a) and b), can be shortened and lengthened. The actuators 42 are cylinder and rod actuators whose mode of action is to linearly extend and retract the rod. The elongated support members 50 translate linearly within the upper slide guides 46. Therefore, the lifting arm subassemblies 40 provide both pivotably moveable portions and linearly translatable portions so that the door operating mechanism comprises both a pivotably moveable portion and a linearly translatable portion.

The door 21 is connected to the door operating mechanism by fixedly mounting the door 21 on the lower slide guides 47. Fixedly mounting the door 21 may be accomplished for example by bolting, welding or the like or by forming the lower slide guides 47 from the same piece of metal as the door 21. Mounting methods are preferably methods that reduce damage to the door 21 because damaging the door 21 could compromise the function of the door 21.

The lifting arm subassemblies 40 are connected together by the cross-braces 70 to provide structural strength and stability, as well as for other reasons as are described below in connection with operation of the door assembly 20. The cross-braces 70 comprise a first cross-brace 71 connecting together the upper slide guides 46 of the two lifting arm subassemblies 40. The first cross-brace 71 is fixedly connected to the upper slide guides 46, for example by bolting, riveting, welding and the like. The cross-braces 70 also comprise a second cross-brace 72 located distally of the first cross-brace 71, which fixedly connect the elongated support members 50 together at a location between the upper and lower slide guides 46 and 47, respectively. The cross-braces 70 also comprise a third cross-brace 73, which is V-shaped and which fixedly connects the elongated support members 50 together at a location distal from the lower slide guides 47. The third cross-brace 73 is V-shaped to avoid interference with the port 23 during operation of the door assembly 20, as best seen in FIG. 3A.

Operation of the door assembly 20 will now be described with reference to FIG. 3A, FIG. 3B and FIG. 3C, which show the door 21 in a closed and locked configuration, and with reference to FIG. 4A, FIG. 4B and FIG. 4C, which show the door 21 in a closed but unlocked configuration, and with reference to FIG. 5A, FIG. 5B and FIG. 5C, which show the door 21 in a fully open configuration. The process of unlocking and then opening the door 21 follows this order of drawings, while the process of closing and then locking the door 21 the follows the reverse of order of these drawings.

Figures 3A, 3B, 3C:
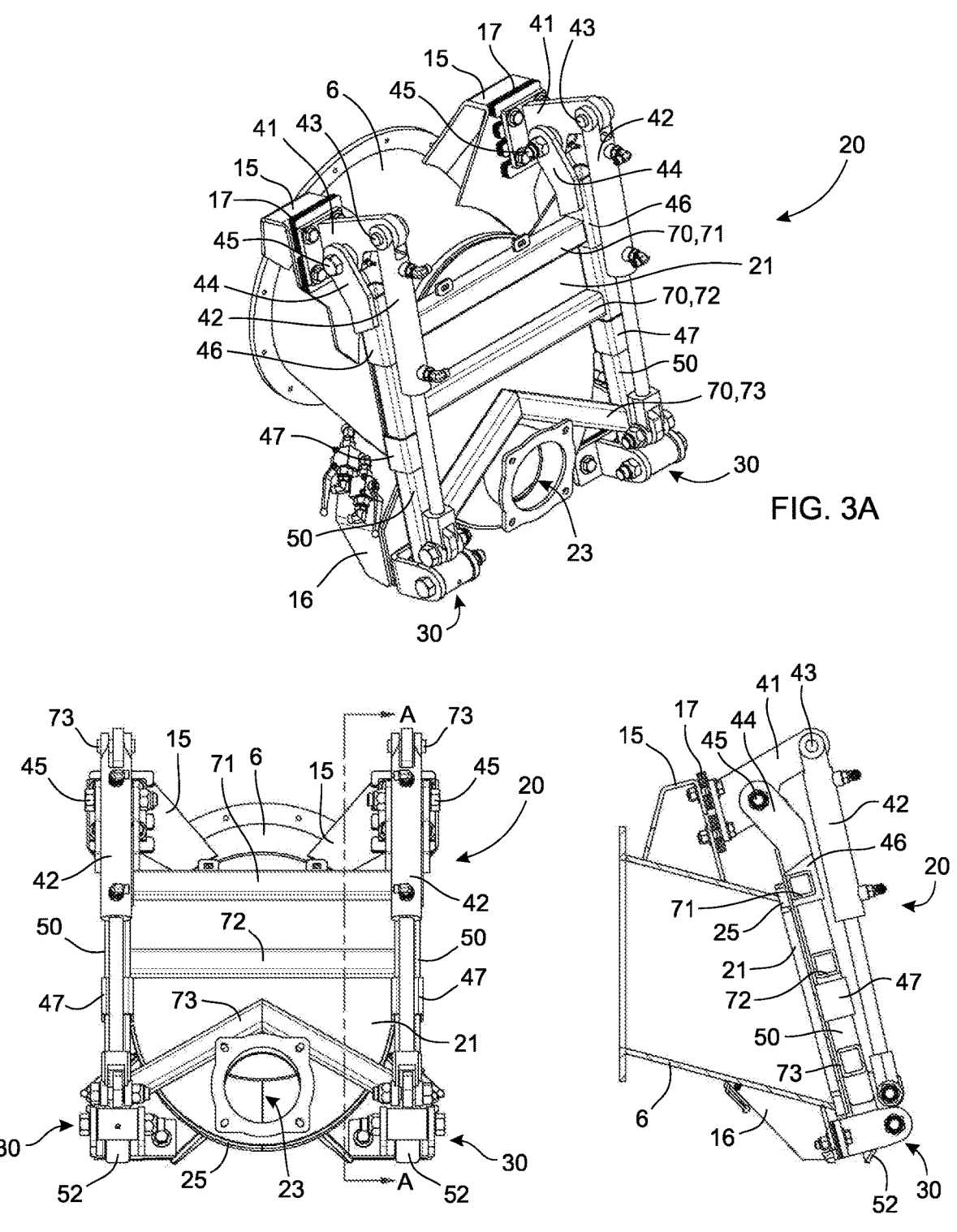
FIG. 3A depicts a rear perspective view of the door assembly for the manure holding tank of the vehicle of FIG. 1, where the door is closed and locked.
FIG. 3B depicts a rear view of the door assembly of FIG. 3A.
FIG. 3C depicts a cross-sectional view through A-A in FIG. 3B.

With reference to FIG. 3A, FIG. 3B and FIG. 3C, in the closed and locked configuration, the actuators 42 are fully extended and the distal ends of the elongated support members 50 are inserted into the latch apertures 34 of the latch subassemblies 30. The door 21 is closed because the door 21 fully covers the manure exit aperture 7 of the tank outlet 6. The door is locked because the distal ends of the elongated support members 50 within the latch apertures 34 prevent the elongated support members 50, and therefore the door 21, from pivoting about the middle pivot axis (i.e., the axis through the hinge pins 45) even if the actuators 42 were to fail. Further, with the actuators 42 fully extended, the door 21 applies pressure against the facing rim of the tank outlet 6, which helps seal the door seal 25 against the tank outlet 6. Furthermore, the pins 33 of the latch subassemblies 30 apply additional pressure to the elongated support members 50 to help seal the door 21 and help keep the door 21 from moving.

Figures 4A, 4B, 4C:
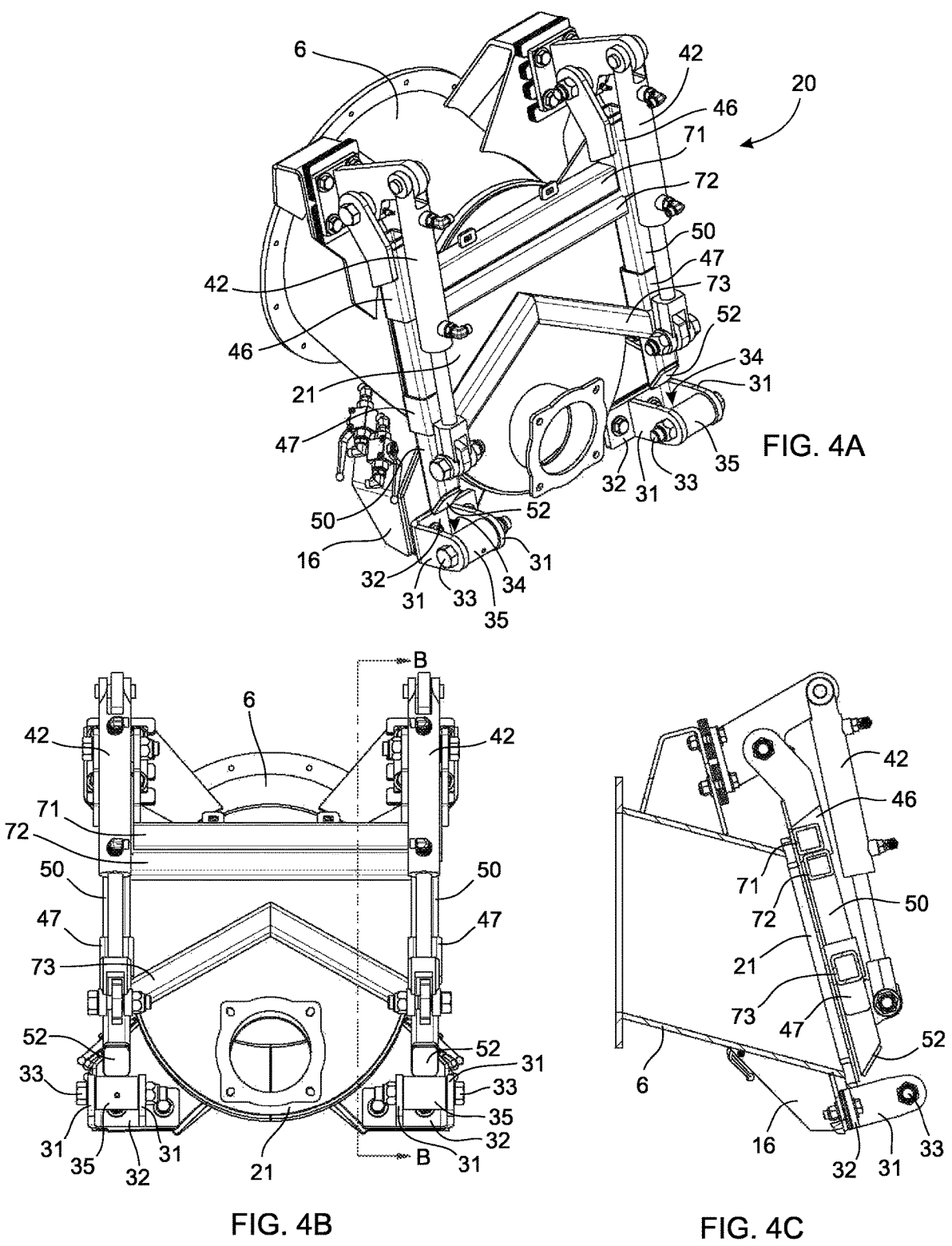
FIG. 4A depicts the door assembly of FIG. 3A where the door is closed but unlocked.
FIG. 4B depicts a rear view of the door assembly of FIG. 4A.
FIG. 4C depicts a cross-sectional view through B-B in FIG. 4B.

With reference to FIG. 4A, FIG. 4B and FIG. 4C, as the actuators 42 are retracted from the position shown in FIG. 3A, FIG. 3B and FIG. 3C, the elongated support members 50 translate linearly in the slide guides 46 and 47 so that the distal ends of the elongated support members 50 exit the latch apertures 34, thereby unlocking the door 21 while the door 21 remains closed. Linear translation of the elongated support members 50 continues until the third cross-brace 73, which fixedly connects the elongated support members 50 together, contacts lower slide guides 47.

Figures 5A, 5B, 5C:
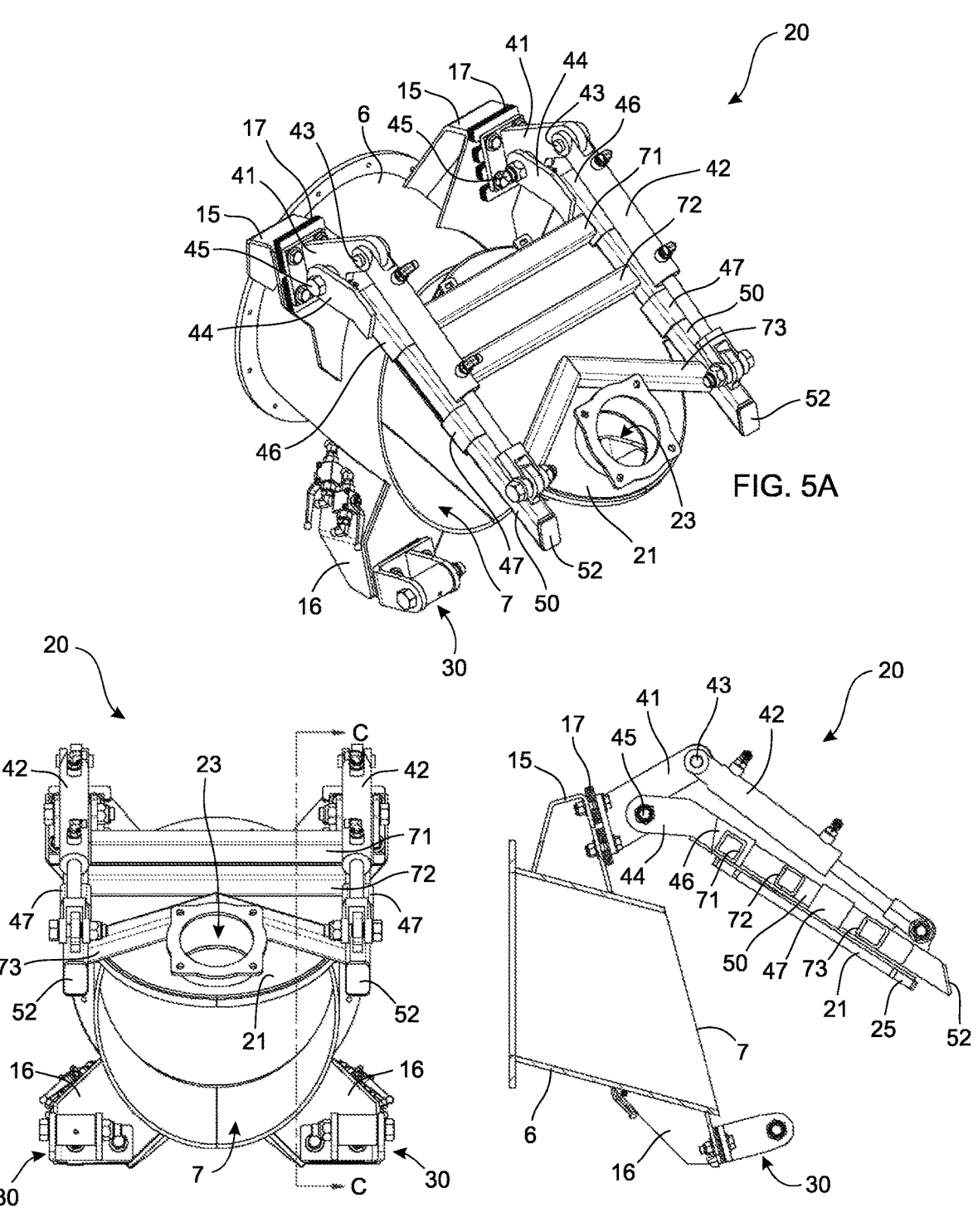
FIG. 5A depicts the door assembly of FIG. 3A where the door is open.
FIG. 5B depicts a rear view of the door assembly of FIG. 5A.
FIG. 5C depicts a cross-sectional view through C-C in FIG. 5B.

With reference to FIG. 5A, FIG. 5B and FIG. 5C, when the third cross-brace 73 engages lower slide guides 47, the third cross-brace 73 acts as a stop for both of the elongated support members 50, so that continued retraction of the actuators 42 now cause the elongated support members 50 to pivot upwardly on the hinge pins 45 about the middle pivot axis rather than translating linearly upward in the slide guides 46 and 47. Upward pivoting of the elongated support members 50 causes the door 21, which is fixedly connected to the lower slide guides 47, to also pivot upwardly thereby opening the door 21 and exposing the manure exit aperture 7 to the outside. When the door 21 is open, the manure in the holding tank 5 can flow out in volume through the tank outlet 6 to be dumped outside the holding tank 5.

To close and lock the door 21 from the fully open configuration (FIG. 5A, FIG. 5B and FIG. 5C) to the closed and locked configuration (FIG. 3A, FIG. 3B and FIG. 3C), the actuators 42 are extended thereby pivoting the elongated support members 50 downwardly on the hinge pins 45 about the middle pivot axis until the door 21 is closed (FIG. 4A, FIG. 4B and FIG. 4C). Further extension of the actuators 42 cannot further pivot the elongated support members 50 because engagement of the door 21 with the tank outlet 6 prevents further arcuate motion of the door 21. Therefore, forces applied by the further extension of the actuators 42 instead cause the elongated support members 50 to translate linearly downward toward the latch subassemblies 30. As the distal ends of the elongated support members 50 enter the latch apertures 34, the tapered portions 52 of the elongated support members 50 engage the rollers 35 until the actuators 42 are fully extended and the distal ends of the elongated support members 50 are contained in the latch apertures 34. The tapered portions 52 contact the rollers 35 of the latch subassemblies 30 to smooth the motion of and guide the elongated support members 50 when the elongated support members 50 translate linearly to lock and unlock the door 21.

The actuators may be used in a reverse orientation, in which case the effect of retraction and extension would be reversed. The ability to smoothly and automatically unlock, open, close and re-lock the rear door using only the operation of a simple actuator is advantageous. An operator can simply switch on the actuator remotely, for example from the cab of the vehicle, and the tasks of opening and closing the rear door are automatically performed using a minimum of powered devices. The compound motion of the linkages in the door assembly driven by a simple extendable/retractable actuator is able to accomplish several tasks that formerly required the direct intervention of an operator of the vehicle.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A door assembly for a manure holding tank, the door assembly comprising:

a door;

at least one latch subassembly for locking the door when the door is closed, the at least one latch subassembly mountable on the manure holding tank; and, a door operating mechanism mountable on the holding tank and connected to the door for opening and closing the door, the door operating mechanism comprising a pivotably moveable portion to open and close the door, the door operating mechanism comprising a linearly translatable portion that cooperates with the at least one latch subassembly to lock and unlock the door;

wherein the door operating mechanism comprises:

at least one elongated support member;

at least one slide guide pivotally mountable to the manure holding tank and fixedly connected to the door, the at least one elongated support member slidingly retained on the at least one slide guide, the at least one elongated support member able to translate linearly on the at least one slide guide relative to the at least one slide guide; and, at least one actuator mountable to the manure holding tank and operably mounted to the at least one elongated support member whereby actuation of the at least one actuator causes the at least one elongated support member to linearly translate on the at least one slide guide to engage and disengage with the latch subassembly to lock and unlock the door and causes the at least one elongated support member to pivot when the door is unlocked thereby causing the at least one slide guide to pivot about a pivot axis to open and close the door.

2. The door assembly of claim 1, wherein the at least one latch subassembly comprises two spaced-apart lugs mountable on the manure holding tank and a pin connecting the lugs to form a latch aperture that engages a distal end of the at least one elongated support member as the at least one elongated support member translates linearly to lock the door when the door is closed.

3. The door assembly of claim 2, wherein the at least one latch subassembly comprises a roller rotatably mounted on the pin and the distal end of the at least one elongated support member comprises a tapered portion that contacts the roller when the at least one elongated support member translates linearly to lock and unlock the door.

4. The door assembly of claim 3, wherein the at least one actuator is operable in a first direction to unlock and then open the door when the door is closed, and the at least one elongated support member comprises at least one stop mounted thereto, the at least one stop positioned on the at least one elongated support member to engage the at least one slide guide after the door is unlocked to prevent further linear translation of the at least one elongated member in the first direction relative to the at least one slide guide so that further actuation of the at least one actuator in the first direction causes the at least one elongated member to pivot thereby causing the at least one slide guide to pivot about the pivot axis to open the door.

5. The door assembly of claim 4, wherein the at least one slide guide comprises a first slide guide and a second slide guide, the first slide guide pivotally mountable to the manure holding tank and slidingly retaining a proximal end portion of the at least one elongated support member, the second slide guide fixedly connected to the door and slidingly retaining a distal end portion of the at least one elongated support member.

6. The door assembly of claim 1, wherein:

the at least one elongated support member comprises a first elongated support member and a second elongated support member, where the first and second elongated support members are spaced-apart;

the at least one slide guide comprises a first slide guide and a second slide guide, the first slide guide pivotally mountable to the manure holding tank to pivot about a first pivot axis and slidingly retaining a proximal end portion of the first elongated support member, the second slide guide fixedly connected to the door and slidingly retaining a distal end portion of the first elongated support member;

the at least one slide guide comprises a third slide guide and a fourth slide guide, the third slide guide pivotally mountable to the manure holding tank to pivot about a second pivot axis and slidingly retaining a proximal end portion of the second elongated support member, the fourth slide guide fixedly connected to the door and slidingly retaining a distal end portion of the second elongated support member;

the at least one actuator comprises a first actuator and a second actuator, the first actuator pivotally mountable to the manure holding tank proximate the proximal end of the first elongated support member and pivotally mounted to the distal end portion of the first elongated support member, the second actuator pivotally mountable to the manure holding tank proximate the proximal end of the second elongated support member and pivotally mounted to the distal end portion of the second elongated support member;

the first and second actuators are operable in a first direction to unlock and then open the door when the door is closed;

the door assembly further comprises a cross-brace connecting the first elongated support member to the second elongated support member, the cross-brace positioned on the first and second elongated support members to engage the second and fourth slide guides after the door is unlocked to prevent further linear translation in the first direction of the first and second elongated members relative to the second and fourth slide guides so that further actuation of the first and second actuators in the first direction causes the first and second elongated members to pivot thereby causing the first and third slide guides to pivot about respective pivot axes to open the door.

7. The door assembly of claim 6, further comprising a first hinge and a second hinge, wherein the first and third slide guides are fixedly connected to the first and second hinges, respectively, and the first and second hinges are pivotally mountable to the holding tank to be pivotal about the respective pivot axes.

8. The door assembly of claim 7, further comprising a first mounting arm and a second mounting arm, the first and second mounting arms fixedly mountable to the manure holding tank proximate the proximal ends of the first and second elongated support members, wherein:

the first actuator is pivotally connected to the first mounting arm;

the second actuator is pivotally connected to the second mounting arm;

the first hinge is pivotally connected to the first mounting arm; and, the second hinge is pivotally connected to the second mounting arm.

9. The door assembly of claim 6, further comprising another cross-brace connecting the first and third slide guides.

10. The door assembly of claim 6, wherein the at least one latch subassembly comprises a first latch subassembly and a second latch subassembly that cooperate with the first and second elongated support members, respectively, to lock and unlock the door, wherein each of the latch assemblies comprise two spaced-apart lugs mountable on the manure holding tank and a pin connecting the lugs to form a latch aperture that engages a distal end of the respective elongated support members as the elongated support members translate linearly to lock the door when the door is closed.

11. The door assembly of claim 10, wherein each of the latch assemblies further comprise a roller rotatably mounted on the pin and the distal ends of the respective elongated support members comprise a tapered portion that contacts the roller when the elongated support members translate linearly to lock and unlock the door.

12. The door assembly of claim 1, wherein the at least one actuator comprises a piston and cylinder actuator.

13. The door assembly of claim 1, wherein the at least one actuator comprises a hydraulic cylinder.

14. The door assembly of claim 1, wherein the door comprises a port configured to be interchangeably plugged with a plug or fitted with a sprayer conduit.

15. A manure collecting vehicle comprising:

a manure collector;

a manure holding tank in communication with the manure collector to permit passage of collected manure from the manure collector to the manure holding tank; and, a door assembly of claim 1 mounted on the manure holding tank to cover a manure exit aperture in the manure holding tank.

16. The vehicle of claim 15, wherein the manure holding tank comprises a tank outlet and the door assembly is mounted on the tank outlet.

17. The vehicle of claim 15, wherein the manure holding tank is a vacuum tank.

* * * * *